(12) United States Patent
Arai et al.

(10) Patent No.: US 9,873,851 B2
(45) Date of Patent: Jan. 23, 2018

(54) GREASE COMPOSITION FOR ELECTRIC POWER STEERING DEVICE, AND ELECTRIC POWER STEERING DEVICE

(71) Applicants: JX NIPPON OIL & ENERGY CORPORATION, Tokyo (JP); HITACHI AUTOMOTIVE SYSTEMS STEERING, LTD., Saitama (JP)

(72) Inventors: Takashi Arai, Yokohama (JP); Kazumi Sakai, Yokohama (JP); Yuji Shitara, Kuki (JP); Satoshi Taniuchi, Kanagawa (JP); Kohtaro Shiino, Kanagawa (JP); Tatsuro Suzuki, Kanagawa (JP)

(73) Assignees: JX NIPPON OIL & ENERGY CORPORATION, Tokyo (JP); HITACHI AUTOMOTIVE SYSTEMS STEERING, LTD., Saitama (JP)

(*) Notice: Subject to any disclaimer, the term of this patent is extended or adjusted under 35 U.S.C. 154(b) by 0 days.

(21) Appl. No.: 14/422,530

(22) PCT Filed: Aug. 29, 2013

(86) PCT No.: PCT/JP2013/073105
§ 371 (c)(1),
(2) Date: Feb. 19, 2015

(87) PCT Pub. No.: WO2014/034761
PCT Pub. Date: Mar. 6, 2014

(65) Prior Publication Data
US 2015/0232778 A1 Aug. 20, 2015

(30) Foreign Application Priority Data
Aug. 31, 2012 (JP) .................................. 2012-191060

(51) Int. Cl.
*C10M 141/06* (2006.01)
*B62D 5/00* (2006.01)
(Continued)

(52) U.S. Cl.
CPC .............. *C10M 141/06* (2013.01); *B62D 3/04* (2013.01); *B62D 5/0409* (2013.01)

(58) Field of Classification Search
CPC . C10M 141/06; C10M 2201/082; B62D 3/04; B62D 5/0409
See application file for complete search history.

(56) References Cited

U.S. PATENT DOCUMENTS 5,681,799 A * 10/1997 Song .......................... C08F 8/00
508/454
2006/0154830 A1* 7/2006 Olliges ................ C10M 169/04
508/155
(Continued)

FOREIGN PATENT DOCUMENTS

| CN | 1771316 | 5/2006 |
|---|---|---|
| CN | 101270316 | 9/2008 |

(Continued)

OTHER PUBLICATIONS

Durasyn 170 Product Information (Feb. 2002).*
(Continued)

*Primary Examiner* — Pamela H Weiss
(74) *Attorney, Agent, or Firm* — Greenblum & Bernstein, P.L.C.

(57) ABSTRACT

Provided are both a grease composition for an electric power steering device and an electric power steering device. The grease composition can keep a sufficiently low coefficient of friction in a sliding area between a steel and a resin over a long period, is less susceptible to being removed from the sliding area, does not cause break down of an oil film, and (Continued)

thus can minimize the occurrence of stick-slips. A grease composition for an electric power steering device, containing a synthetic hydrocarbon oil which exhibits a density of 0.75 to 0.95 g/cm$^3$ at 15° C., a saturated aliphatic amide compound, boron nitride, a glycerin fatty acid partial ester, and a metal soap-based thickener; and an electric power steering device using the grease composition.

11 Claims, 1 Drawing Sheet

(51) Int. Cl.
*B62D 3/04* (2006.01)
*B62D 5/04* (2006.01)

(56) References Cited

U.S. PATENT DOCUMENTS

| 2006/0264338 | A1* | 11/2006 | Kawamura | C10M 123/04 508/168 |
|---|---|---|---|---|
| 2009/0270290 | A1* | 10/2009 | Sawaguchi | C10M 169/00 508/370 |
| 2010/0132499 | A1 | 6/2010 | Nakatani et al. | |
| 2010/0298183 | A1* | 11/2010 | Hiyoshi | C07C 219/06 508/202 |

FOREIGN PATENT DOCUMENTS

| EP | 1 972 681 | | 9/2008 |
|---|---|---|---|
| JP | 8-209167 | | 8/1996 |
| JP | 2002-363589 | | 12/2002 |
| JP | 2002-371290 | | 12/2002 |
| JP | 2003-3185 | | 1/2003 |
| JP | 2005-133791 | | 5/2005 |
| JP | 2006089575 | A * | 4/2006 |
| JP | 2007-191523 | | 8/2007 |
| JP | 101189321 | A | 5/2008 |
| JP | 2008-208199 | | 9/2008 |
| JP | 2008-231293 | | 10/2008 |
| JP | 2011-225781 | | 11/2011 |
| WO | 2006/114442 | | 11/2006 |

OTHER PUBLICATIONS

International Search Report for PCT/JP2013/073105, dated Nov. 19, 2013.
International Preliminary Report on Patentability for PCT/JP2013/073105, dated Mar. 12, 2015.
Chinese Office Action issued with respect to application No. 201380045593.7, dated Jul. 19, 2016.
Search Report issued in European Patent Office (EPO) Counterpart Patent Appl. No. 13833123.6, dated May 19, 2016.
Liang, *Petrochemistry*, University of Petroleum Press, Second Printing, pp. 237, 1996.
Office Action issued in China Patent Appl. No. 201380045593.7, dated Mar. 4, 2016, along with an English translation thereof.

* cited by examiner

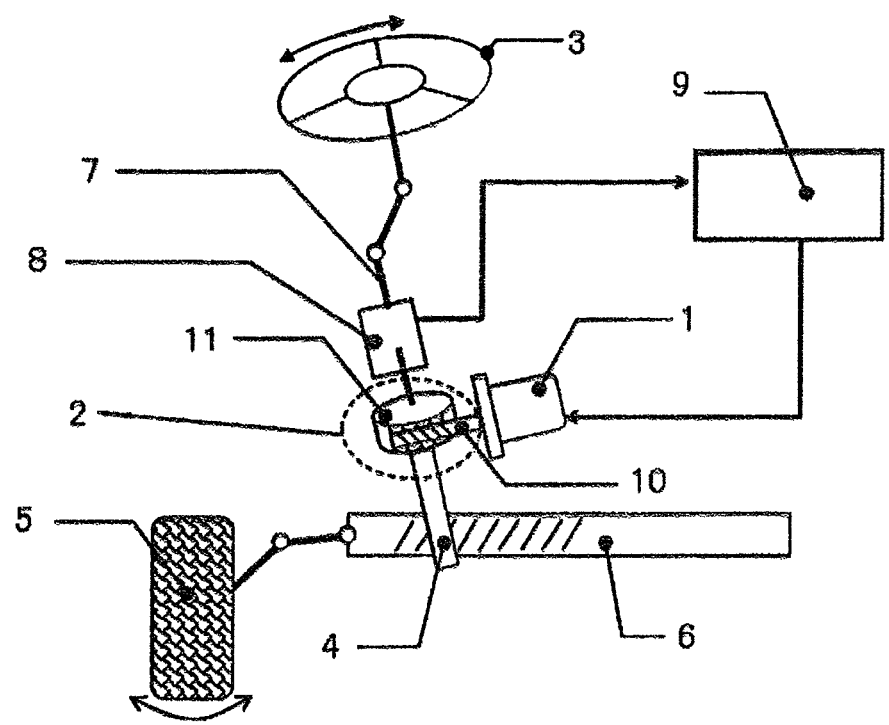

GREASE COMPOSITION FOR ELECTRIC POWER STEERING DEVICE, AND ELECTRIC POWER STEERING DEVICE

TECHNICAL FIELD

The present invention relates to a grease composition for electric power steering devices with which the occurrence of stick-slip can be reduced, and to electric power steering devices.

BACKGROUND ART

Automobile power steering devices are in wide use. The majority of the power steering devices are hydraulic, whereby a hydraulic pump providing a steering force is constantly driven by the power of the engine. The constant driving of the hydraulic pump, applied irrespective of the need for steering, contributes to poor fuel economy. On the other hand, electric power steering uses an electric motor to provide a steering force, and drives the electric motor only when steering the vehicle. The fuel saving effect is thus much greater than that of the hydraulic power steering device. Because the steering force to produce in comparison with the hydraulic power steering is small as for the electric power steering, the use of electric power steering device has limited to relatively smaller and lighter vehicles. However, the number of vehicles with the electric power steering system has been increasing because of the better fuel efficiency.

The sliding area of an electric power steering is configured from a steel worm shaft and a worm wheel having resin teeth. The resin typically uses nylon, a type of polyamide. Some of the properties required for a grease as a lubricant that is used in such a sliding area include a low friction property for improved transmission efficiency, and an anti-stick-slip property for stably maintaining a low torque over extended time periods.

A number of greases mixed with various waxes have been proposed as lubricants for use in electric power steering devices having such a steel-resin sliding area. Examples include a grease as a mixture of a thickener and a base oil with a montan wax (PTL 1), a grease as a mixture of a thickener and a base oil with a polyethylene oxide-based wax (PTL 2), and a grease as a mixture of a thickener and a base oil with a carboxylic acid amide-based wax (PTL 3). Another example is a solid lubricant, or a grease of primarily polytetrafluoroethylene (PTL 4). Yet another example is a grease mixed with an ionic liquid (PTL 5).

These greases all have low coefficients of friction or a low torque. A problem, however, is that the grease tends to gradually become removed from the sliding area under the friction over a long period of use, and then the oil film finally breaks down and possibly causes stick-slip. Stick-slip may cause resistance in the movement of the steering wheel, and may spoil the steering feel in situations where high output is needed such as in parking a car.

CITATION LIST

Patent Literature

PTL 1: JP-A-2002-371290
PTL 2: JP-A-2003-3185
PTL 3: JP-A-2008-208199
PTL 4: JP-A-2002-363589
PTL 5: JP-A-2007-191523

SUMMARY OF INVENTION

Technical Problem

It is an object of the present invention to provide a grease composition for electric power steering devices that can maintain a sufficiently low coefficient of friction at the sliding area between steel and resin for extended time periods, and with which the grease does not easily become removed from the sliding area, and thus prevents the break down of an oil film, and reduces the occurrence of stick-slip. The invention is also intended to provide an electric power steering device that uses such a grease composition.

Solution to Problem

The present inventors conducted intensive studies to solve the foregoing problems, and found that a grease composition that can maintain a sufficiently low coefficient of friction at the sliding area between steel and resin for extended time periods, and with which the grease does not easily become removed from the sliding area, and thus prevents the break down of an oil film, and reduces the occurrence of stick-slip can be obtained with use of a saturated aliphatic amide compound, boron nitride, a glycerin fatty acid partial ester, and a metal soap-based thickener.

The present invention has been made on the basis of this finding, as follows.

(1) A grease composition for electric power steering devices comprising;
a synthetic hydrocarbon oil having a density of 0.75 to 0.95 g/cm$^3$ at 15° C.,
a saturated aliphatic amide compound,
boron nitride,
a glycerin fatty acid partial ester, and
a metal soap-based thickener.

(2) The grease composition for electric power steering devices according to (1), wherein the synthetic hydrocarbon oil is a poly-α-olefin, and is contained in 50 to 95 mass % with respect to a total amount of the grease composition.

(3) The grease composition for electric power steering devices according to (1), wherein the saturated aliphatic amide compound is contained in 5 to 20 mass % with respect to a total amount of the grease composition.

(4) The grease composition for electric power steering devices according to (1), wherein the boron nitride is contained in 0.2 to 5 mass % with respect to a total amount of the grease composition.

(5) The grease composition for electric power steering devices according to (1), wherein the glycerin fatty acid partial ester is contained in 0.1 to 5 mass % with respect to a total amount of the grease composition.

(6) The grease composition for electric power steering devices according to (1), wherein the metal soap-based thickener is contained in 2 to 15 mass % with respect to a total amount of the grease composition.

(7) An electric power steering device which is configured from a steering mechanism for turning wheels in response to a steering operation of a steering wheel, a motor that provides a steering force to the steering mechanism and a worm gear that transmits a torque of the motor to the steering mechanism, comprising;
the worm gear being configured from a worm wheel formed of a resin material and a worm shaft formed of a metallic material, and a grease composition applied to a meshing surface of the worm wheel and the worm shaft, wherein the grease composition contains a synthetic hydrocarbon oil having a density of 0.75 to 0.95 g/cm$^3$ at 15° C., a saturated aliphatic amide compound, boron nitride, a glycerin fatty acid partial ester, and a metal soap-based thickener.

Advantageous Effects of Invention

The grease composition of the present invention has notable effects as follows. A boron nitride having cleavage properties reduces the coefficient of friction at the steel-resin sliding area, and the saturated aliphatic amide compound and the glycerin fatty acid partial ester adsorb to the sliding surface. As a result, these maintain a low coefficient of friction at the steel-resin sliding area, prevent the break down of an oil film because the grease does not easily become removed from the sliding area, and reduce the occurrence of stick-slip over extended time periods.

BRIEF DESCRIPTION OF DRAWINGS

FIG. 1 is an explanatory diagram representing a structure of an electric power steering.

DESCRIPTION OF EMBODIMENTS

[Synthetic Hydrocarbon Oil]

The synthetic hydrocarbon oil of the present invention has a density in the range of 0.75 to 0.95 g/cm$^3$ at 15° C. In case the density is outside this range, dispersibility for boron nitride lowers and the synthetic hydrocarbon oil cannot sufficiently lower the coefficient of friction. Preferably, the synthetic hydrocarbon oil is one with a density of 0.8 to 0.9 g/cm$^3$.

The synthetic hydrocarbon oil has a kinetic viscosity of preferably 1 to 500 mm$^2$/s, more preferably 5 to 100 mm$^2$/s at 40° C. In case the kinetic viscosity is outside the 1 to 500 mm$^2$/S range at 40° C., it becomes difficult to readily prepare a grease composition of the desired cone penetration. For preparing a grease of excellent lubricity, it is preferable that the hydrocarbon oil has physical properties with a viscosity index of 90 or more, particularly 95 to 250, a pour point of −10° C. or less, particularly −15 to −70° C., and a flash point of 150° C. or more.

The synthetic hydrocarbon oil is preferably one with excellent hydrolytic stability. Preferred for use as the synthetic hydrocarbon oil are, for example, polyolefins (such as poly-α-olefins, polybutenes, and copolymers of two or more olefins), alkylbenzenes, and alkylnaphthalenes. Poly-α-olefins are preferred in terms of availability, cost, viscosity characteristics, oxidation stability, and compatibility with the system members. For cost considerations, the poly-α-olefins are further preferably polymers of 1-dodecene, 1-decene and so on.

The hydrocarbon oil either alone or as a mixture of two or more may be used for the synthetic hydrocarbon oil. When using a mixture of more than one hydrocarbon oil, the physical properties of the individual unmixed hydrocarbon oils may fall outside of the foregoing ranges, provided that these satisfy the foregoing physical properties as an oil mixture. It is accordingly not necessarily required that the individual hydrocarbon oils satisfy the foregoing physical properties. It is preferable, however, that the physical properties of the individual hydrocarbon oils fall in the foregoing ranges.

The hydrocarbon oil content is preferably 50 to 95 mass %, particularly preferably 60 to 85 mass % with respect to the total amount of the grease composition. It becomes difficult to readily prepare a grease composition of the desired cone penetration when the content of the hydrocarbon oil falls outside of the 50 to 95 mass % range.

[Saturated Aliphatic Amide Compound]

The saturated aliphatic amide compound of the present invention is a compound with at least one amide group (—NH—CO—), and may be a compound with one amide group (monoamide), or a compound with two amide groups (bisamide). Saturated aliphatic bisamides are most preferred for their excellent heat resistance, and for their ability to reduce the frictional resistance of the sliding area even in relatively small amounts.

The saturated aliphatic monoamides are amide compounds of saturated aliphatic monoamine and saturated aliphatic monocarboxylic acid. The saturated aliphatic bisamides may be either amide compounds of saturated aliphatic diamine and saturated aliphatic monocarboxylic acid, or amide compounds of saturated aliphatic dicarboxylic acid and saturated aliphatic monoamine.

Preferred for use is a saturated aliphatic amide compound with a melting point of 100 to 170° C., and a molecular weight of 298 to 876.

The saturated aliphatic monoamides are represented by the following general formula (1), and the saturated aliphatic bisamides are represented by the following general formulae (2) and (3), respectively.

$$R^1\text{—CO—NH—}R^2 \tag{1}$$

$$R^3\text{—CO—NH-}A^1\text{-NH—CO—}R^4 \tag{2}$$

$$R^5\text{—NH—CO-}A^2\text{-CO—NH—}R^6 \tag{3}$$

In the formulae, $R^1$, $R^2$, $R^3$, $R^4$, $R^5$, and $R^6$ each independently represent an aliphatic hydrocarbon group of 5 to 25 carbon atoms. In the case of general formula (1), $R^2$ may represent a hydrogen atom. $A^1$ and $A^2$ represent bivalent saturated aliphatic hydrocarbon groups of 1 to 10 carbon atoms, particularly preferably bivalent saturated chain hydrocarbon groups of 1 to 4 carbon atoms.

Specifically, preferred examples of the saturated aliphatic monoamides include lauramide, palmitamide, stearamide, and behenamide.

Specifically, preferred examples of the saturated aliphatic bisamides represented by the formula (2) include ethylene bis stearamide, ethylene bis isostearamide, and methylene bis lauramide. Preferred examples of the saturated aliphatic bisamides represented by the formula (3) include N,N'-bisstearyl sebacamide.

Preferred bisamides are amide compounds in which $R^1$ and $R^2$ in formulae (2) and (3) are independently saturated chain hydrocarbon groups of 12 to 20 carbon atoms.

The amide compounds may be used either alone or in a combination of two or more in any proportions. The amide compound content is preferably 5 to 20 mass % with respect to the total amount of the grease composition.

When melted under heat in the presence of the synthetic hydrocarbon oil, the amide compound transforms into a state in which the oil is retained in the three-dimensional network structure of the amide compound. This further lowers the coefficient of friction at the steel-resin sliding area than when the amide compound is simply dispersed and mixed in the grease.

[Boron Nitride]

The boron nitride used in the present invention may be any of hexagonal atmospheric phase (h-BN) powders widely used as solid lubricants. These may be used after appropriately selecting suitable-sized particles according to the intended use. The particle diameter is preferably 1 to 10 μm.

The boron nitride content is preferably 0.2 to 5 mass % with respect to the total amount of the grease composition.

[Glycerin Fatty Acid Partial Ester]

The glycerin fatty acid partial ester used in the present invention is a monoester or diester compound synthesized from fatty acid and glycerine, and that has had one or two hydroxyl groups of the glycerine esterified with the fatty acid. The glycerin fatty acid partial ester is preferably a monoester. Triester compounds are not preferable because these form a thin film less efficiently and thus are less effective at reducing friction than the partial esters.

In the present invention, it is preferable that the fatty acid residue has 12 to 25 carbon atoms. The monoesters are represented by the following general formula (4) or (5). The diesters are represented by the formula (6) or (7).

$$R^7-COO-CH_2-CH(OH)-CH_2OH \quad (4)$$

$$HO-CH_2-CH(OCO-R^8)-CH_2OH \quad (5)$$

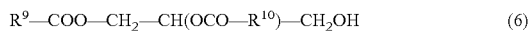
$$R^9-COO-CH_2-CH(OCO-R^{10})-CH_2OH \quad (6)$$

$$R^{11}-COO-CH_2-CH(OH)-CH_2-OCO-R^{12} \quad (7)$$

In the formulae (4) to (7), $R^7$, $R^8$, $R^9$, $R^{10}$, $R^{11}$, and $R^{12}$ each independently represent a saturated or unsaturated chain hydrocarbon group of 12 to 25 carbon atoms, and some of the hydrogen atoms in the hydrocarbon group may be substituted with a hydroxyl group.

Specific preferred examples of such glycerin fatty acid partial esters include saturated fatty acid monoglycerides and saturated fatty acid diglycerides such as glycerol monolaurate, glycerol dilaurate, glycerol monopalmitate, glycerol dipalmitate, glycerol monostearate, glycerol distearate, glycerol monobehenate, glycerol dibehenate, glycerol monohydroxystearate, and glycerol dihydroxystearate; and unsaturated fatty acid monoglycerides and unsaturated fatty acid diglycerides such as glycerol monooleate, glycerol dioleate, glycerol monoerucate, and glycerol dierucate.

The glycerin fatty acid partial esters may be used either alone or in a combination of two or more in any proportions. The content of the glycerin fatty acid partial ester is preferably 0.1 to 5 mass % with respect to the total amount of the grease composition.

[Metal Soap-Based Thickener]

The metal soap-based thickener is a thickener based on a carboxylic acid metal salt, and the carboxylic acid may be a carboxylic acid derivative having a hydroxyl group or the like.

The carboxylic acid may be an aliphatic carboxylic acid such as stearic acid and azelaic acid, or an aromatic carboxylic acid such as terephthalic acid. Preferably, the carboxylic acid is a monovalent or divalent aliphatic carboxylic acid, particularly an aliphatic carboxylic acid of 6 to 20 carbon atoms. More preferably, a monovalent aliphatic carboxylic acid of 12 to 20 carbon atoms, and a divalent aliphatic carboxylic acid of 6 to 14 carbon atoms may be used. Particularly preferred is a monovalent aliphatic carboxylic acid containing one hydroxyl group.

The metal may be an alkali metal such as lithium and sodium; an alkali earth metal such as calcium; or an amphoteric metal such as aluminum. Preferably, the metal is an alkali metal, particularly lithium.

The thickener may be mixed in the form of a metal soap, or may be prepared as a metal soap thickener by separately mixing carboxylic acid and a metal source (such as a metal salt, and a metal salt hydroxide etc.) and reacting these components at the time of producing the grease.

The carboxylic acid metal salt may be used either alone or as a mixture of two or more. For example, a mixture of lithium 12-hydroxystearate and lithium azelate is particularly preferred.

The metal soap-based thickener may be added in any content, as long as the desired cone penetration is obtained. For example, the content of the metal soap-based thickener is preferably 2 to 15 mass % with respect to the total amount of the grease composition.

[Other Additives]

Additives may be appropriately added to the grease composition of the present invention as required, in addition to the foregoing components. Examples of such additives include common additives for lubricant and grease such as detergents, dispersants, antiwear agents, viscosity index improvers, antioxidants, extreme-pressure agents, anti-rusting agents, and corrosion preventing agents.

[Preparation Method]

The grease composition of the present invention may be produced by using a common grease producing process. It is, however, preferable to mix the saturated aliphatic amide compound, and then once heat the mixture at a temperature equal to or greater than the melting point of the saturated aliphatic amide compound.

Specifically, the method may comprise; heating the saturated aliphatic amide compound and the synthetic hydrocarbon oil at a temperature equal to or greater than the melting point of the amide compound, cooling the mixture, and then physically mixing the mixture with a common grease containing boron nitride, a thickener, and a synthetic hydrocarbon oil. Alternatively, a mixture of all the components containing the thickener may be heated at a temperature equal to or greater than the melting point of the amide compound, and then cooled to prepare the grease composition.

[Subject of Lubrication]

The grease composition of the present invention may preferably be used for lubrication of an electric power steering device that includes a resin sliding member and a metallic sliding member.

As illustrated in FIG. 1, such an electric power steering is configured from a motor 1 for generating assisting power, a reduction drive 2 for amplifying the torque of the motor, a pinion gear 4 that transmits the steering torque and angle of a steering wheel 3 through the torque of the reduction drive, and a rack gear 6 that translates the steering torque of the pinion gear 4 into linear motion to generate a force that turns a tire 5.

The steering force from the steering wheel 3 is applied to an input shaft 7, and a torque sensor 8 detects a torsion in the torsion bar provided between the input shaft 7 and the pinion gear 4. With the detected steering force and at the detected steering timing, the motor generates the required assisting torque under the control of the calculated current value from a controller 9.

The reduction drive 2 serves to amplify the assisting torque of the motor, and is configured from a worm shaft 10 with a metal gear, for example, such as a chromium molybdenum steel (e.g., SCM415), and a carbon steel (e.g., S45C), and a worm wheel 11 that includes a metal core and a toothed resin gear, for example, such as nylon 6 and nylon 66 containing 30% glass.

When the reduction ratio is about 18 and the maximum assisting torque generated by the motor is about 5 Nm, about a 90 Nm torque generates at the worm wheel. For reasons related to characteristics of the worm shaft, a slipping velocity and a surface pressure at the tooth surface are large. Therefore the slipping velocity is about 3 m/s at the normal maximum steering velocity of 700°/s, and the tooth surface pressure is about 60 MPa at the maximum assisting torque.

Under these conditions, static friction increases at the tooth surface, and the difference between dynamic friction and static friction increases when the desirable lubricity is no longer maintained, and tends to cause resistance upon activation. This is called stick-slip, a problem associated with the perception of resistance through the steering wheel, and bad steering feel. The grease is applied to reduce stick-slip.

EXAMPLES

1. Synthetic Hydrocarbon Oil
  (a) Poly-α-olefin (Durasyn 170, INEOS Ltd.)
    Kinetic viscosity at 40° C.: 68 mm$^2$/s
    Density at 15° C.: 0.83 g/cm$^3$
    Viscosity index: 133
    Pour point: −45° C.
    Flash point: 250° C.
    An amine-based antioxidant was added to the poly-α-olefin.
2. Amide Compounds
    (1) Aliphatic amide
      (a) Ethylene bisstearamide (guaranteed reagent)
      (b) Stearic acid monoamide (guaranteed reagent)
3. Boron Nitride
    Average particle size: 2 μm (HP-P1, Mizushima Ferroalloy Co., Ltd.)
    Average particle size was measured by using a laser diffraction method.
4. Glycerin Fatty Acid Partial Esters
    (1) Glycerol monooleate (guaranteed reagent)
    (2) Glycerol monostearate (guaranteed reagent)
5. Metal Soap-Based Thickener
    (1) Lithium 12-hydroxystearate ("Lithium stearate" in the table)
    (2) A complex of lithium 12-hydroxystearate and lithium azelate (a 2:1 mixture; "Mixed lithium soap" in the table)
[Preparation Method]

Each component was charged into a container in the amount (mass %) shown in Table 1, heated at 150° C. (equal to or greater than the melting point of the amide compound), stirred with a magnetic stirrer, and then cooled to room temperature. The mixture was subjected to a pressurized dispersion process with rollers (three rollers were used) to prepare a grease composition.
[Lab Evaluation Method]

The grease was evaluated in a lab for its attributes and performance in the manner described below. The worked penetration and the dropping point of the grease representing hardness and heat resistance, respectively, were measured according to JIS K2220.

The friction characteristics of the grease were evaluated in a test conducted with a reciprocating friction tester using a ball and a disc.

As a model of the steel-resin sliding area of the electric power steering, an SUJ-2 ball having a ¼-inch diameter, and a nylon 6 plate [N6 (NC), Toyo Plastic Precision Co., Ltd.] were used as the metal sliding member and the resin sliding member, respectively. The grease was applied to the disc, and the presence or absence of stick-slip was evaluated from the coefficient of friction and the waveform of the frictional force generated by sliding under the test load of 2,000 gf, the sliding rate of 10 mm/s, and the amplitude of 20 mm (stick-slip was determined to be present when the frictional force from unidirectional sliding was not constant). A lower coefficient of friction improves the transmission efficiency of the power steering device, and a more stable waveform of the frictional force improves the anti-stick-slip property.

The evaluation results are presented in Table 1.
[Lab Evaluation Results]

The mixture of the hydrocarbon oil with the amide compound, boron nitride, and glycerin fatty acid partial ester had a relatively low coefficient of friction, and a high anti-stick-slip property. However, the dropping point was low at 135° C. because of the lack of the thickener (Comparative Example 1).

The mixture of the hydrocarbon oil with the lithium soap, boron nitride, and glycerin fatty acid partial ester had a high dropping point of 250° C.; however, the coefficient of friction was high, the anti-stick-slip property was poor, and the lubricity was insufficient (Comparative Example 2). The mixture of the base oil with the lithium soap and the amide compound had a high dropping point of 230° C., and a slightly low coefficient of friction, but the anti-stick-slip property was insufficient (Comparative Example 3).

The mixtures of the hydrocarbon oil with the lithium soap, boron nitride, glycerin fatty acid partial ester, and saturated aliphatic amide compound had a low coefficient of friction and a high anti-stick-slip property while maintaining a high dropping point of 200° C. or more (Examples 1 to 6).
[Actual Evaluation Method]

The grease compositions of Example 4 and Comparative Examples 1 and 3 were subjected to a working durability test, whereby the grease was applied to the steel worm shaft and the toothed resin worm wheel of the electric power steering device. SCM 415, and nylon 6 with 30% glass fiber were used as the materials of the steel worm shaft and the toothed resin worm wheel, respectively.

Efficiency was determined from the input torque to the worm shaft and the output torque from the worm wheel. For evaluation, "average efficiency" was determined under varying temperature conditions and varying load torque conditions.

The working durability test was conducted under maximum output load conditions, and the presence or absence of stick-slip after 100,000 runs was determined for evaluation.

The evaluation results are presented in Table 2.
[Actual Evaluation Results]

The average gear efficiency was high, but the anti-stick-slip property was poor, and the lubricity was insufficient in the mixture of the hydrocarbon oil with the amide compound, boron nitride, and glycerin fatty acid partial ester, and in the mixture of the hydrocarbon oil with the lithium soap and the amide compound (Comparative Examples 1 and 3).

The average gear efficiency, and the lubricity for anti-stick-slip property improved with the mixture of the hydrocarbon oil with the lithium soap, boron nitride, glycerin fatty acid partial ester, and aliphatic amide (Example 4).

TABLE 1

| | | Example 1 | Example 2 | Example 3 | Example 4 | Example 5 | Example 6 | Comp. Example 1 | Comp. Example 2 | Comp. Example 3 |
|---|---|---|---|---|---|---|---|---|---|---|
| Hydrocarbon oil | Poly-α-olefin | 78 | 78 | 78 | 78 | 76 | 76 | 68 | 83 | 80 |
| Amide compound | Stearic acid monoamide | | 10 | | | | | | | |
| | Stearic acid bisamide | 10 | | 10 | 10 | 10 | 10 | 30 | | 10 |
| Boron nitride | | | 1 | 1 | 1 | 1 | 3 | 1 | 1 | 1 |
| Glycerin fatty acid partial ester | Glycerol monooleate | 1 | 1 | | | 1 | 3 | 1 | 1 | |
| | Glycerol monostearate | | | 1 | 1 | | | | | |
| Thickener | Lithium stearate | 10 | 10 | 10 | | 10 | 10 | | 15 | 10 |
| | Mixed lithium soap | | | | 10 | | | | | |
| Lab Evaluation results | Worked penetration | 330 | 340 | 330 | 330 | 320 | 340 | 370 | 330 | 340 |
| | Dropping point (° C.) | 200 | 200 | 200 | 250 | 200 | 200 | 135 | 250 | 230 |
| | Coefficient of friction | 0.040 | 0.040 | 0.035 | 0.035 | 0.035 | 0.035 | 0.045 | 0.060 | 0.050 |
| | Anti-stick-slip property | ○ | ○ | ○ | ○ | ○ | ○ | ○ | X | X |

TABLE 2

| | | Example 4 | Comp. Example 1 | Comp. Example 3 |
|---|---|---|---|---|
| Actual Evaluation results | Average gear efficiency (%) | 84 | 85 | 82 |
| | Number of runs at stick-slip (cycles) | 100,000 | 50,000 | 35,000 |

INDUSTRIAL APPLICABILITY

The grease composition of the present invention is useful for the lubrication of the sliding area of an electric power steering device having a resin sliding member and a metallic sliding member.

REFERENCE SIGNS LIST

1 Motor
2 Reduction drive
3 Steering wheel
4 Pinion gear
5 Tire
6 Rack gear
7 Input shaft
8 Torque sensor
9 Controller
10 Worm shaft
11 Worm wheel

The invention claimed is:

1. A grease composition for electric power steering devices, consisting of:
a synthetic hydrocarbon oil having a density of 0.75 to 0.95 g/cm³ at 15° C.,
a saturated aliphatic amide compound,
boron nitride,
a glycerin fatty acid partial ester, and
a metal soap-based thickener,
wherein the saturated aliphatic amide compound is selected from the group consisting of compounds represented by the following formulae (1), (2), and (3):

$$R^1\text{—CO—NH—}R^2 \tag{1}$$

$$R^3\text{—CO—NH-}A^1\text{-NH—CO—}R^4 \tag{2}$$

$$R^5\text{—NH—CO-}A^2\text{-CO—NH—}R^6 \tag{3},$$

wherein $R^1$, $R^2$, $R^3$, $R^4$, $R^5$, and $R^6$ each independently represents an aliphatic hydrocarbon group of 5 to 25 carbon atoms, and $R^2$ may alternatively represent a hydrogen atom, and
wherein $A^1$ and $A^2$ represent bivalent saturated aliphatic hydrocarbon groups of 1 to 10 carbon atoms.

2. The grease composition for electric power steering devices according to claim 1, wherein the synthetic hydrocarbon oil is a poly-α-olefin, and is contained in 50 to 95 mass % with respect to the total amount of the grease composition.

3. The grease composition for electric power steering devices according to claim 1, wherein the saturated aliphatic amide compound is contained in 5 to 20 mass % with respect to the total amount of the grease composition.

4. The grease composition for electric power steering devices according to claim 1, wherein the boron nitride is contained in 0.2 to 5 mass % with respect to the total amount of the grease composition.

5. The grease composition for electric power steering devices according to claim 1, wherein the glycerin fatty acid partial ester is contained in 0.1 to 5 mass % with respect to the total amount of the grease composition.

6. The grease composition for electric power steering devices according to claim 1, wherein the metal soap-based thickener is contained in 2 to 15 mass % with respect to the total amount of the grease composition.

7. An electric power steering device comprising:
a steering mechanism for turning wheels in response to a steering operation of a steering wheel,
a motor that provides a steering force to the steering mechanism,
a worm gear that transmits torque of the motor to the steering mechanism, the worm gear being configured from a worm wheel formed of a resin material, and a worm shaft formed of a metallic material, with a grease composition applied to a meshing surface of the worm wheel and the worm shaft, wherein the grease composition consists of a synthetic hydrocarbon oil having a density of 0.75 to 0.95 g/cm$^3$ at 15° C., a saturated aliphatic amide compound, boron nitride, a glycerin fatty acid partial ester, and a metal soap-based thickener, wherein the saturated aliphatic amide compound is selected from the group consisting of compounds represented by the following formulae (1), (2), and (3):

$$R^1\text{—CO—NH—}R^2 \quad (1)$$

$$R^3\text{—CO—NH-}A^1\text{-NH—CO—}R^4 \quad (2)$$

$$R^5\text{—NH—CO-}A^2\text{-CO—NH—}R^6 \quad (3),$$

wherein $R^1$, $R^2$, $R^3$, $R^4$, $R^5$, and $R^6$ each independently represents an aliphatic hydrocarbon group of 5 to 25 carbon atoms, and $R^2$ may alternatively represent a hydrogen atom, and wherein $A^1$ and $A^2$ represent bivalent saturated aliphatic hydrocarbon groups of 1 to 10 carbon atoms.

8. The grease composition according to claim 1, wherein the boron nitride is a hexagonal atmospheric phase powder having a particle diameter of 1 to 10 μm.

9. A method for lubricating an electric power steering device that includes a resin sliding member and a metallic sliding member, comprising applying a grease composition that consists of:
a synthetic hydrocarbon oil having a density of 0.75 to 0.95 g/cm$^3$ at 15° C.;
boron nitride;
a glycerin fatty acid partial ester;
a metal soap-based thickener; and
a saturated aliphatic amide compound selected from the group consisting of compounds represented by the following formulae (1), (2), and (3):

$$R^1\text{—CO—NH—}R^2 \quad (1)$$

$$R^3\text{—CO—NH-}A^1\text{-NH—CO—}R^4 \quad (2)$$

$$R^5\text{—NH—CO-}A^2\text{-CO—NH—}R^6 \quad (3),$$

wherein $R^1$, $R^2$, $R^3$, $R^4$, $R^5$, and $R^6$ each independently represents an aliphatic hydrocarbon group of 5 to 25 carbon atoms, and $R^2$ may alternatively represent a hydrogen atom, and wherein $A^1$ and $A^2$ represent bivalent saturated aliphatic hydrocarbon groups of 1 to 10 carbon atoms.

10. A grease composition for electric power steering devices, consisting of:
a synthetic hydrocarbon oil having a density of 0.75 to 0.95 g/cm$^3$ at 15° C.,
a saturated aliphatic amide compound,
boron nitride,
a glycerin fatty acid partial ester,
a metal soap-based thickener, and
at least one antioxidant,
wherein the saturated aliphatic amide compound is selected from the group consisting of compounds represented by the following formulae (1), (2), and (3):

$$R^1\text{—CO—NH—}R^2 \quad (1)$$

$$R^3\text{—CO—NH-}A^1\text{-NH—CO—}R^4 \quad (2)$$

$$R^5\text{—NH—CO-}A^2\text{-CO—NH—}R^6 \quad (3),$$

wherein $R^1$, $R^2$, $R^3$, $R^4$, $R^5$, and $R^6$ each independently represents an aliphatic hydrocarbon group of 5 to 25 carbon atoms, and $R^2$ may alternatively represent a hydrogen atom, and wherein $A^1$ and $A^2$ represent bivalent saturated aliphatic hydrocarbon groups of 1 to 10 carbon atoms.

11. An electric power steering device comprising:
a steering mechanism for turning wheels in response to a steering operation of a steering wheel,
a motor that provides steering force to the steering mechanism,
a worm gear that transmits & torque of the motor to the steering mechanism, the worm gear being configured from a worm wheel formed of a resin material, and a worm shaft formed of a metallic material, with a grease composition applied to a meshing surface of the worm wheel and the worm shaft,
wherein the grease composition consists of
a synthetic hydrocarbon oil having a density of 0.75 to 0.95 g/cm$^3$ at 15° C.,
a saturated aliphatic amide compound,
boron nitride,
a glycerin fatty acid partial ester,
a metal soap-based thickener, and
at least one antioxidant,
wherein the saturated aliphatic amide compound is selected from the group consisting of compounds represented by the following formulae (1), (2), and (3):

$$R^1\text{—CO—NH—}R^2 \quad (1)$$

$$R^3\text{—CO—NH-}A^1\text{-NH—CO—}R^4 \quad (2)$$

$$R^5\text{—NH—CO-}A^2\text{-CO—NH—}R^6 \quad (3),$$

wherein $R^1$, $R^2$, $R^3$, $R^4$, $R^5$, and $R^6$ each independently represents an aliphatic hydrocarbon group of 5 to 25 carbon atoms, and $R^2$ may alternatively represent a hydrogen atom, and wherein $A^1$ and $A^2$ represent bivalent saturated aliphatic hydrocarbon groups of 1 to 10 carbon atoms.

* * * * *